United States Patent [19]

Calistrat

[11] 4,437,847
[45] Mar. 20, 1984

[54] FLEXIBLE COUPLING

[75] Inventor: Michael M. Calistrat, Sykesville, Md.

[73] Assignee: Koppers Company, Inc., Pittsburgh, Pa.

[21] Appl. No.: 395,369

[22] Filed: Jul. 6, 1982

Related U.S. Application Data

[63] Continuation of Ser. No. 146,253, May 5, 1980, abandoned.

[51] Int. Cl.³ .............................................. F16D 3/74
[52] U.S. Cl. ......................................... 464/74; 464/83
[58] Field of Search ................... 464/74, 76, 83, 90, 464/89

[56] References Cited

U.S. PATENT DOCUMENTS

| | | | |
|---|---|---|---|
| 1,425,616 | 8/1922 | Tarbox | 464/74 |
| 1,443,440 | 1/1923 | Spicer et al. | 464/74 |
| 1,561,192 | 11/1925 | Spicer et al. | 464/76 |
| 1,564,186 | 12/1925 | Spicer et al. | 464/76 |
| 2,343,839 | 3/1944 | Austin | 464/76 |
| 2,621,493 | 12/1952 | Croset | 464/74 |
| 2,764,003 | 9/1956 | Croset | 464/74 |
| 2,873,590 | 2/1959 | Croset | 464/74 |
| 3,257,825 | 6/1966 | Croset | 464/74 |
| 3,675,750 | 7/1972 | Wright | 464/74 X |

FOREIGN PATENT DOCUMENTS

| | | | |
|---|---|---|---|
| 1815877 | 9/1970 | Fed. Rep. of Germany | 464/76 |
| 632841 | 11/1978 | U.S.S.R. | 464/76 |

*Primary Examiner*—Stuart S. Levy
*Assistant Examiner*—Daniel P. Stodola
*Attorney, Agent, or Firm*—Thomas L. Sivak; Herbert J. Zeh, Jr.

[57] ABSTRACT

A flexible coupling in which the torque is transmitted by elastomeric elements held in compression. The coupling includes a sleeve assembly comprised of a plurality of independent arcuate elements and a retainer ring assembly which maintain the elastomeric elements in operable contact with the blades of the hub during rotation of the coupling.

6 Claims, 6 Drawing Figures

FLEXIBLE COUPLING

This is a continuation, of application Ser. No. 146,253, filed May 5, 1980, now abandoned.

BACKGROUND OF THE INVENTION

1. Field of the Invention

This invention relates to flexible couplings and, more particularly, to flexible couplings in which torque is transmitted between two shafts by means of elastomeric elements in compression.

2. Description of the Prior Art

Flexible couplings for transmitting torque between misaligned driving and driven shafts by means of elastomeric elements in compression are old and well known in the art, see U.S. Pat. No. 2,873,590. Such couplings have not only demonstrated the ability to compensate for misalignment between the driving and driven shaft but also to protect the driving and driven members from shock loading and vibration. While over the years these couplings have given good service in the field, assembly and disassembly is a difficult problem because the elastomeric elements must be inserted in the cavity formed by the sleeve and hub axially and be precompressed during the process of insertion. This problem of precompression during insertion becomes increasingly severe as the size of the coupling increases. Also, if the coupling must be disassembled, as in the case when the coupled machinery must be replaced, all the elastomeric elements are normally damaged in the process and must be replaced, thereby increasing the cost of maintenance. Further, the cost of these types of couplings has always been relatively high. For the foregoing reasons these type flexible couplings have not achieved the degree of acceptance in industry that the performance and reliability they provide would ordinarily have achieved.

SUMMARY OF THE INVENTION

The present invention overcomes the foregoing problems of the prior art by providing a flexible coupling in which the elastomeric elements can be assembled into the coupling or removed therefrom radially. The elastomeric elements are inserted into the sleeve segments and assembled radially over a hub blade without the need of the degree of precompression required by the prior art. The present invention minimizes the problem of assembly and disassembly. Also, the cost of the coupling has been significantly reduced.

The sleeve element of the coupling is comprised of a plurality of cylindrical segments adapted to retain the elastomeric elements in operable contact with the coupling hub which is mounted on a driving or driven shaft. The individual cylindrical elements of the sleeve are mated to the rigid hub which is mounted on a driving or driven shaft by means of a retainer ring. The retainer ring is fixed to the rigid hub by means of fasteners such as bolts.

DESCRIPTION OF THE PREFERRED EMBODIMENT

Figure 1:
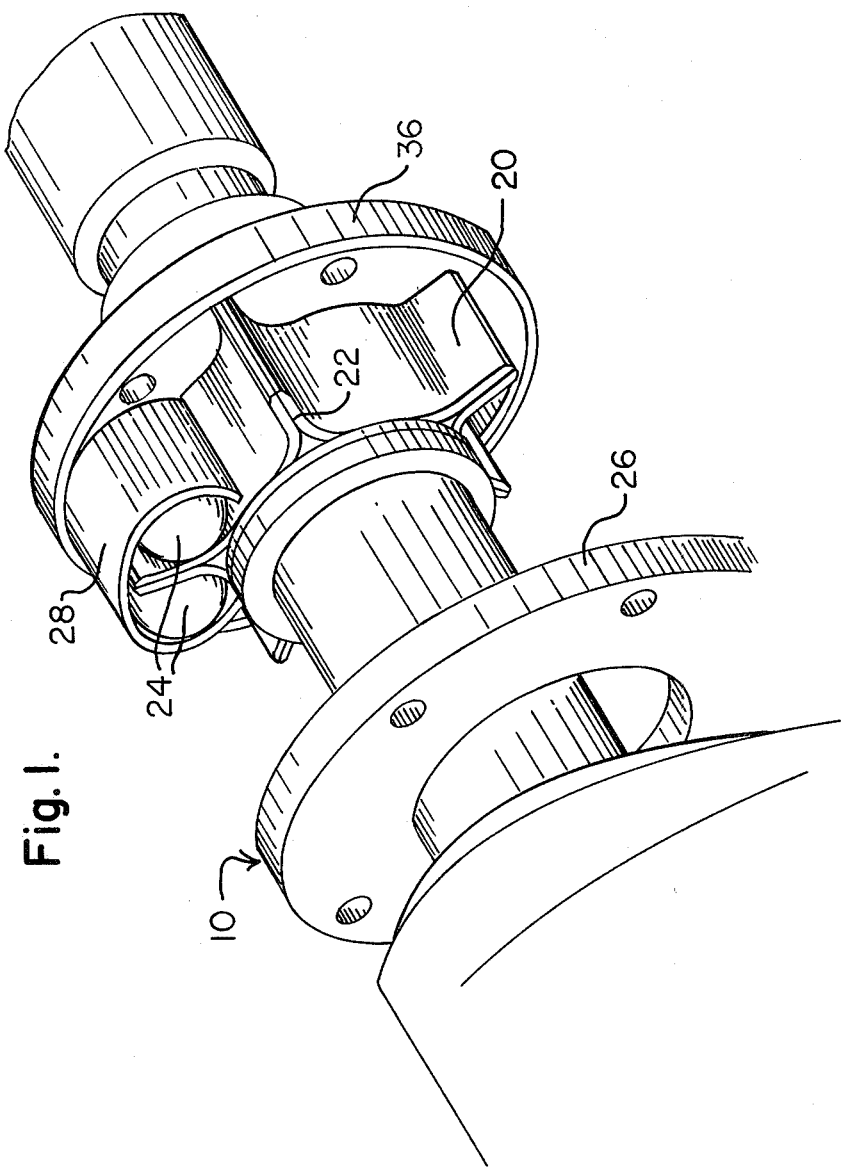
FIG. 1 is a isometric view of the coupling of the present invention in the process of being assembled.
Figure 2:
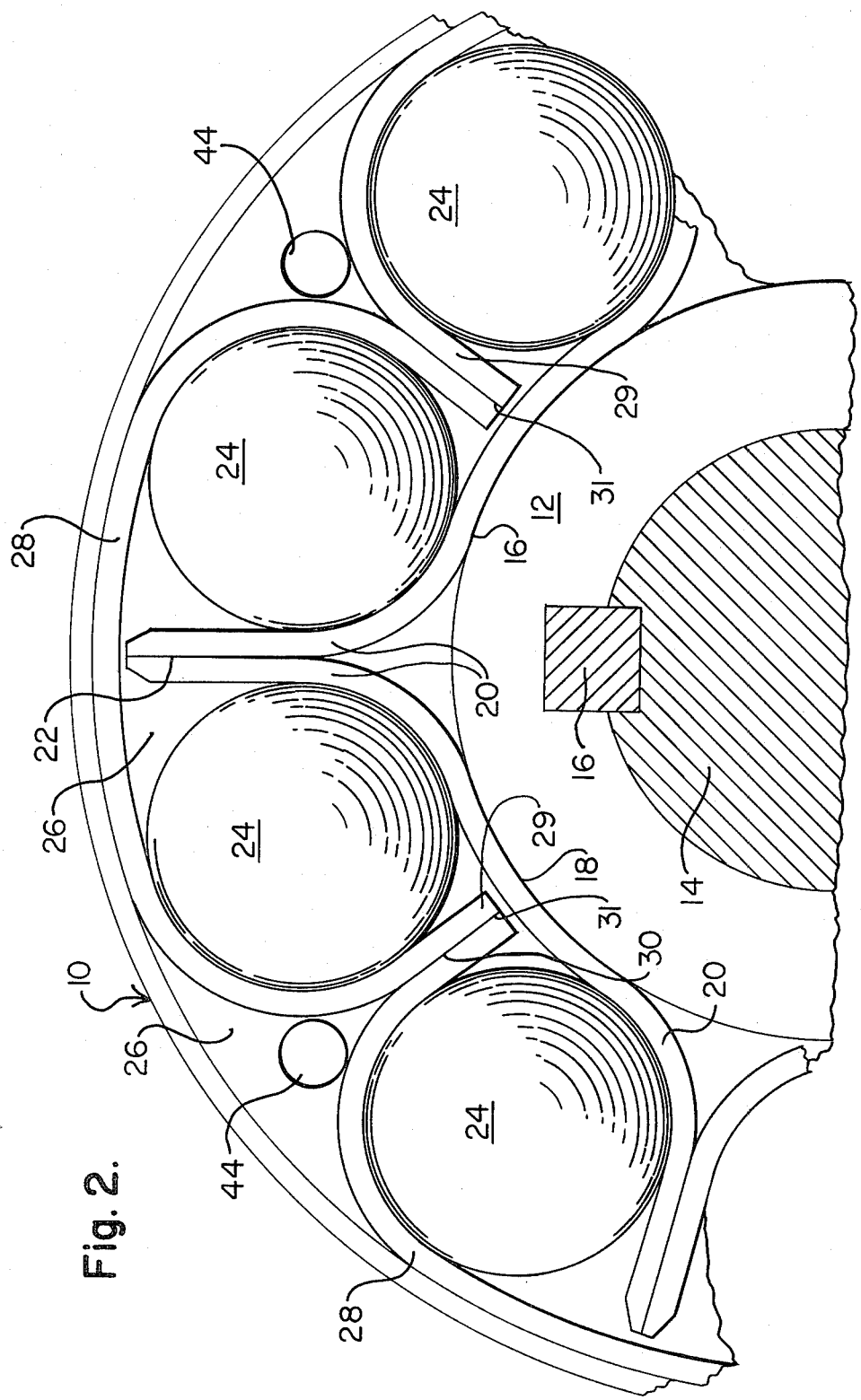
FIG. 2 is a fragmentary end view, in section of the coupling of the present invention.

Referring to FIG. 2, the coupling of the present invention generally designated 10 is comprised of a hub 12 which is made of steel and is adapted to be keyed to a shaft, 14 by means of key 16. Fixed to hub 12 by a weld 18 are a plurality of blades 20. It will be understood that a conventional cast hub can be used in place of this fabricated hub. In the preferred embodiment, hub 12 has five blades. As will be described below, the hub may have less or more blades than the preferred embodiment. As shown in FIG. 1, each blade 20 is adapted to abut the adjoining blade at interface 22. Each blade is of like length and width.

The sleeve element of the coupling is comprised of a plurality of cylindrical segments 28. Cylindrical segments 28 are determined by displacing a straight line parallel to itself while being perpendicular to and constantly intersecting a planar curve defined by three arcs and two lines. In the preferred embodiment, since the hub 12 has five blades 20, the sleeve is comprised of five cylindrical metallic segments. Each cylindrical segment must be of identical axial length and at least as long as blades 20. The faces 33 and 34 thereof must be parallel to each other and perpendicular to the outer periphery 35. Each of the segments 28 are placed around the blades of hub 12 as shown in FIG. 1. The cylindrical segments 28 are constructed so that the angle between the straight portions 29 is slightly less than 360° divided by 5, it being understood that if more or less than 5 cylindrical segments are used then the angle between the straight portions will be less than 360° divided by the number of elements. This will insure that when the segments and blades 24 are assembled around blades 20 of hub 12 as described below, the cylindrical segments 28 will contact in the area of tips 31, but when the coupling is finally assembled the straight portions 29 will mate and form interface 30 of significant area. Elastomeric elements 24 of this preferred embodiment are solid cylinders of an elastomeric material such as rubber.

As shown in FIG. 1 when a pair of elastomeric elements 24 are inserted in cylindrical segments 28 and cylindrical segments 28 of the sleeve are placed around the blades 20 of hub 12 a small amount of precompression is created in each element 24. The assembled hub and sleeve is now placed between retainer ring 26 and rigid hub 36, FIGS. 1 and 3. However, retainer ring 26 is independent of hub 12 and shaft 14. Rigid hub 36 is mounted on driven shaft 46. The assembled hub and sleeve are now fixed between the retainer ring 26 and the rigid hub 36 by means of bolts 40 which extend through openings 42 in rigid hub 36 and 44 in retainer ring 26. In the preferred embodiment five bolts are used for symmetry with the blades of the hub 12 and cylindrical segment 28.

Retainer ring 26 and rigid hub 36 have mirror image chamfers 32 and 38. Because of chamfers 32 and 38 and the clamping effect caused by bolts 40, the sleeve elements 28 move radially toward the axis of the coupling compressing the elastomeric elements 24 in the process of clamping. Whereas the cylindrical segments 28 of the sleeve are solidly clamped between retainer ring 26 and rigid hub 36 by reason of the contact with faces 33 and 34, the hub 12 is free to move, within limits, in the axial, radial and angular directions so that the coupling can accommodate misalignment between the driving and driven shafts.

It is clear from the foregoing that rotation of shaft 14 will cause rotation of hub 12 and blades 20. Torque will be transmitted from blades 20 to elastomeric elements 24 to sleeve segments 28 which are fixed to rigid hub 36. The torque will cause rotation of hub 36 and shaft 46.

Figure 4:
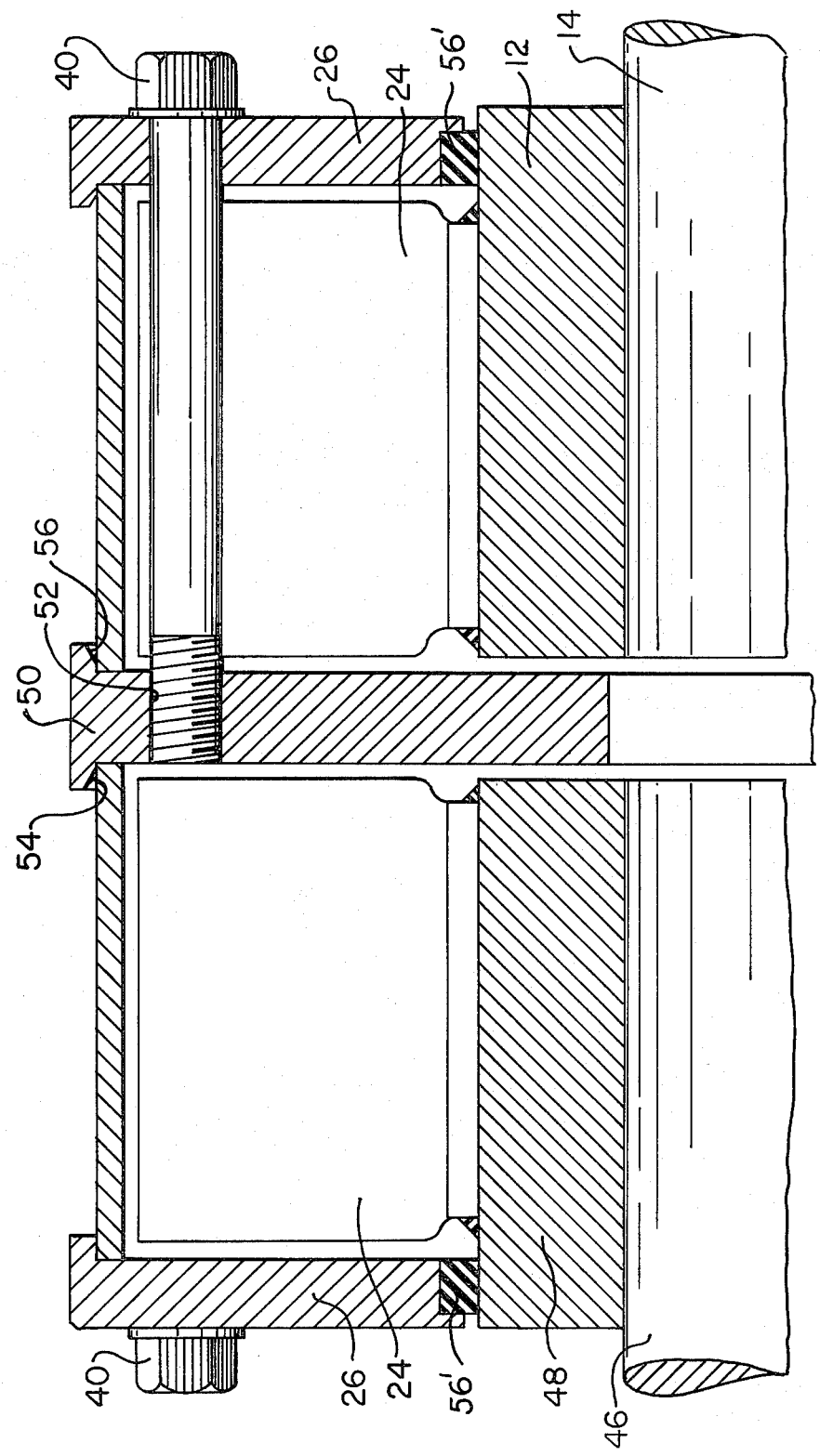
FIG. 4 is a fragmentary side view, in section, of two couplings of the present invention in a back to back arrangement.

An alternative embodiment of the coupling is shown in FIG. 4 when two such couplings are used to correct relatively large misalignments. This arrangement is known in the art as "full flex". In this embodiment driving hub 12 transmits the torque to a driven hub 48 through two couplings as described in the preferred embodiment minus the rigid hubs but interconnected by a common plate 50. In this embodiment the bolts 40 of each coupling are threaded in staggered and tapped holes 52 of said plate 50. Plate 50 has chamfered guides 54 and 56 on both sides to accommodate the cylindrical segments 28 of the sleeves as previously described. In order to maintain a reasonable dynamic balance guide bushings 56' may be used between retainer rings 26 and hubs 12 and 48.

Figure 5:
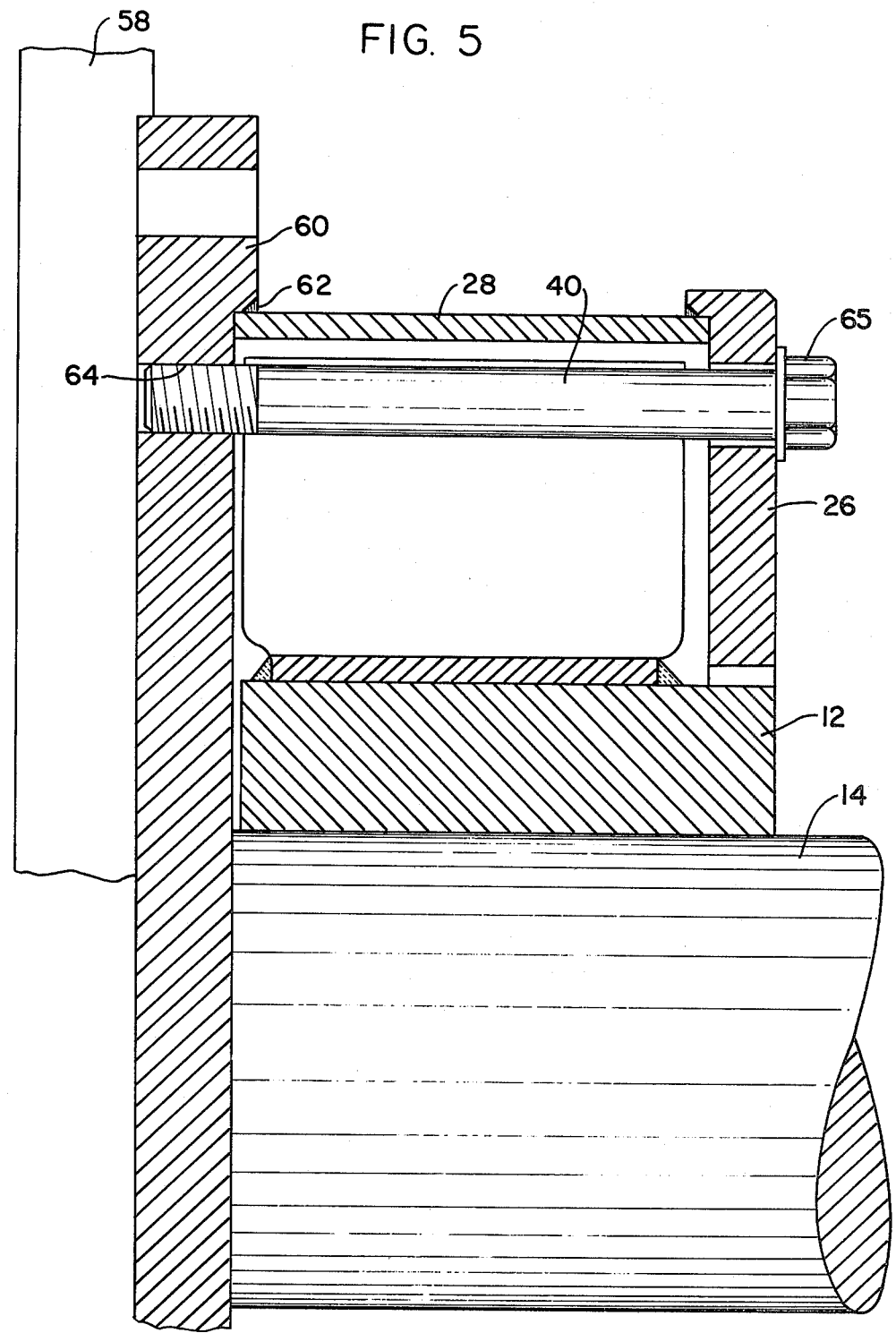
FIG. 5 is a fragmentary side view, in section, of a flywheel mounted coupling of the present invention.

Another embodiment of the coupling of the present invention is used in connection with internal combustion engines. The coupling is mounted on the engine's flywheel 58, as illustrated in FIG. 5. An adaptor 60 is bolted to the flywheel 58 in a conventional manner. The adaptor, which acts as a rigid hub, is provided with chamfered guides 62 and tapped holes 64. Cylindrical segments 28 are fitted in the same manner as previously described, using retainer ring 26 and bolts 40. The torque from the flywheel is thus transmitted to the shaft 14 through the hub 12.

Figure 6:
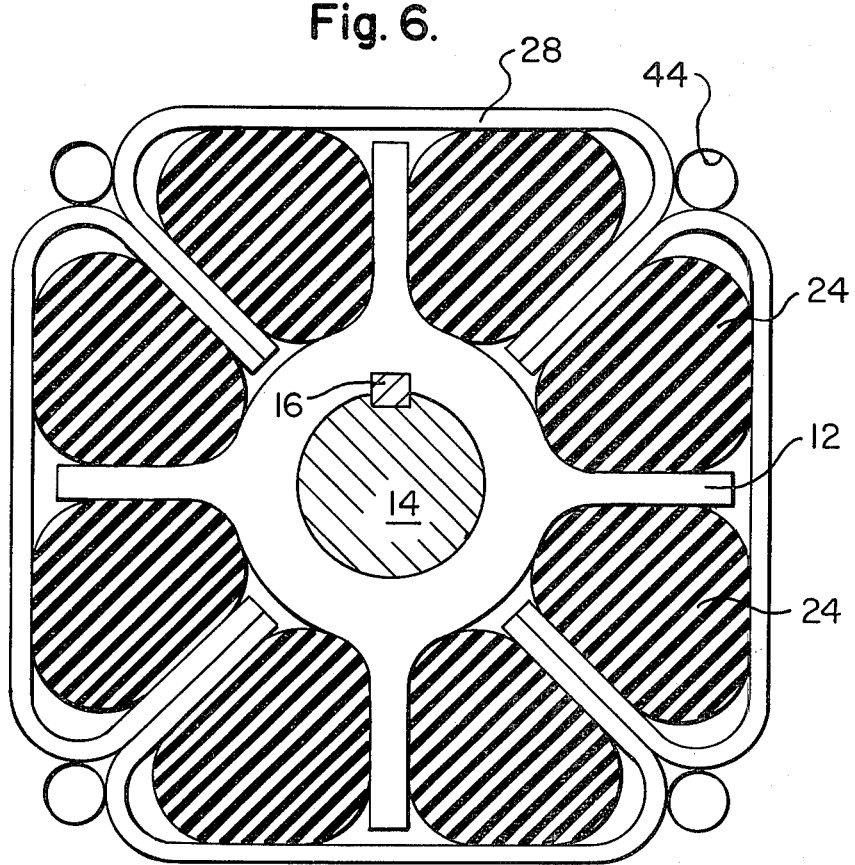
FIG. 6 is a fragmentary end view, in section, of an alternate embodiment of the coupling of the present invention.

It is known that the present invention could be embodied in a configuration other than a circular one. One such configuration is illustrated in FIG. 6.

Figure 3:
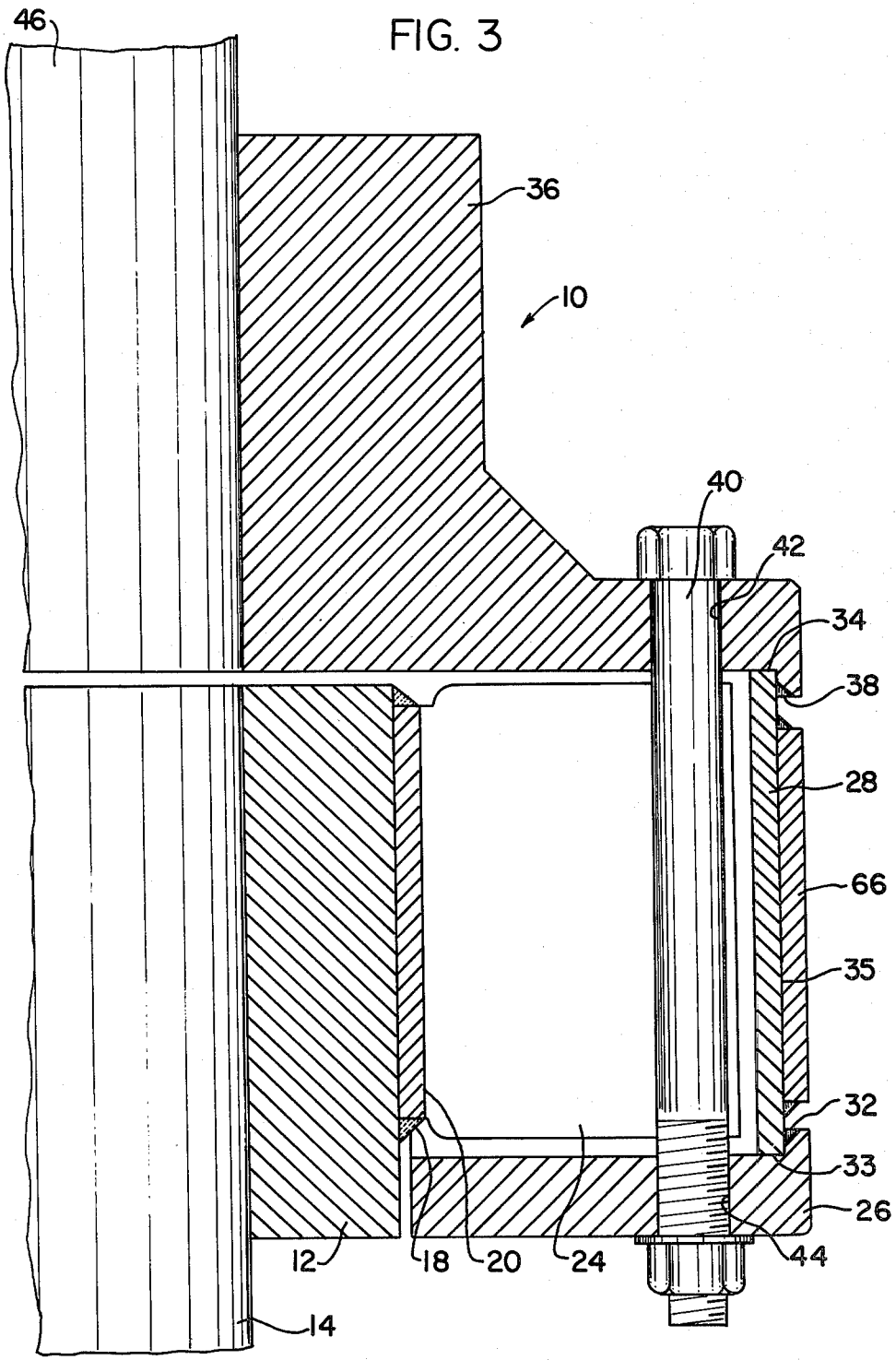
FIG. 3 is a fragmentary side view, in section of the coupling of FIG. 1.

If desired in any embodiment of the present invention, a continuous circumferential band 66 can be welded to the outside circumference of the cylindrical elements 28, as shown typically in FIG. 3. It will be understood, however, that use of band 66 eliminates the advantage of radial assembly of the elastomeric elements but the cost benefit of the invention is retained.

While I have described certain preferred embodiments of my invention, it will be understood that it may otherwise be embodied within the scope of the following claims.

What is claimed:

1. An improved flexible coupling for transmitting torque between a driving and driven shaft, comprising:
   (a) a plurality of elastomeric elements;
   (b) first hub means fixed to a shaft, said first hub means having blade means comprised of a plurality of blades engaging said elastomeric elements;
   (c) sleeve means comprised of a plurality of cylindrical segments having radially inwardly extending straight end portions circumferentially arranged about said first hub means, the end portions of adjacent segments abutting over a substantial area thereof, said segments being positioned radially toward said blade means to maintain said plurality of elastomeric elements in engagement with said blades during rotation of said coupling;
   (d) retainer means having chamfered guide means engaging said sleeve means; and
   (e) second hub means fixed to a second shaft placed in substantial alignment with said first shaft, said second hub means having chamfered guide means engaging said sleeve means and being fixed to said retainer means by fastening means, whereby rotation of one of said hub means will cause rotation of the other hub means through said elastomeric elements.

2. The flexible coupling of claim 1 wherein the outside circumferences of said segments of said sleeve means are operably connected.

3. An improved flexible coupling for transmitting torque between a driving and driven shaft, comprising:
   (a) a plurality of elastomeric elements;
   (b) first hub means fixed to a first shaft, said first hub means having first blade means comprised of a plurality of blades engaging said elastomeric elements;
   (c) first sleeve means comprised of a plurality of cylindrical segments having radially inwardly extending straight end portions circumferentially arranged about said first hub means, the end portions of adjacent segments abutting over a substantial area thereof, said segments being positioned radially toward said first blade means to maintain said plurality of elastomeric elements in engagement with said blades during rotation of said coupling;
   (d) retainer means having chamfered guide means engaging said segments of said sleeve means;
   (e) second hub means fixed to a second shaft in substantial alignment with said first shaft, said second hub means having second blade means comprised of a plurality of blades engaging said elastomeric elements;
   (f) second sleeve means comprised of a plurality of cylindrical segments having radially inwardly extending straight end portions circumferentially arranged about said second hub means, the end portions of adjacent segments abutting over a substantial area thereof, said segments being positioned radially toward said second blade means to maintain said plurality of elastomeric elements in engagement with said blades during rotation of said coupling;
   (g) second retainer means having chamfered guide means engaging said segments of said second sleeve means; and
   (h) plate means disposed between said first and second hub means, said plate means having chamfered guide means receiving said segments of said first and second sleeve means, said plate means being fixed to said first and second retainer means by fastening means, whereby rotation of one of said hubs will cause rotation of the other hub through elastomeric elements.

4. The flexible coupling of claim 3 wherein the outside circumferences of said segments of said first sleeve means are operably interconnected and said segments of said second sleeve means are operably interconnected.

5. A flexible coupling for transmitting torque from a flywheel to a driven shaft, comprising:
   (a) a plurality of elastomeric elements;

(b) hub means fixed to a driven shaft, said hub means having blade means comprised of a plurality of blades engaging said elastomeric elements;

(c) sleeve means comprised of a plurality of cylindrical segments having radially inwardly extending straight end portions circumferentially arranged about said hub means, the end portions of adjacent segments abutting over a substantial area thereof, said segments being positioned radially toward said blade means to maintain said plurality of elastomeric elements in engagement with said blades during rotation of said coupling;

(d) retainer means having chamfered guide means engaging said segments of said sleeve means; and (e) adapter means fixed to said flywheel, said adapter means having chamfered means receiving said segments of said sleeve means and being fixed to said retainer means by fastening means.

6. The flexible coupling of claim 5 wherein the outside circumference of the sleeve segments are operably connected.

* * * * *